Feb. 7, 1939.   M. J. SHOEMAKER   2,145,901
PURIFICATION OF WATER
Filed May 22, 1935
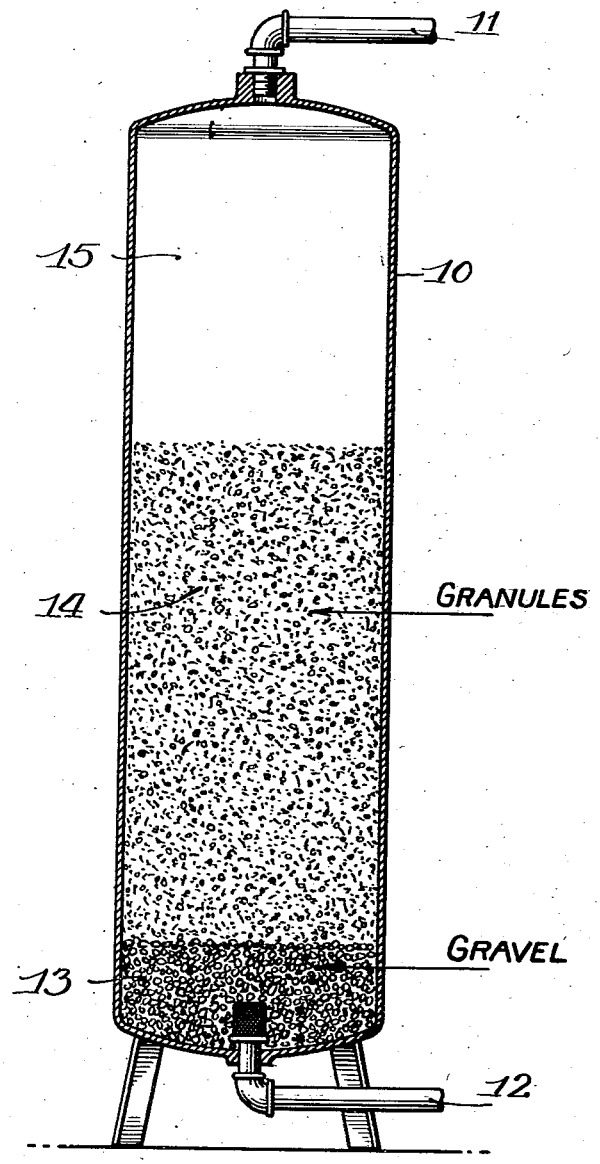
Inventor,
Milton J. Shoemaker,
Dyrenforth, Lee, Chritton + Wiles Attys.

Patented Feb. 7, 1939

2,145,901

UNITED STATES PATENT OFFICE 2,145,901

PURIFICATION OF WATER

Milton J. Shoemaker, Madison, Wis., assignor, by mesne assignments, to Research Products Corporation, Madison, Wis., a corporation of Wisconsin Application May 22, 1935, Serial No. 22,852

8 Claims. (Cl. 210—23)

This invention relates to the purification of water, and particularly to improvements in the treatment for the removal of dissolved iron and manganese compounds and hydrogen sulphide therefrom. To carry out the treatment a material is provided, which, when the water is brought into contact therewith, causes the conversion of the dissolved iron and manganese compounds to insoluble iron and manganese compounds and the precipitation thereof out of solution.

Processes and materials have been known and used in the past for the same general purpose, but they have involved additional operations or treatments, such as independent filtering operations, the continuous application of compounds to the water, the periodic regeneration of the materials, etc. The process and material of the present invention possess the advantage that after the arrangement is completed for the flow of the water in contact with the material, under normal conditions no further treatment is required except an occasional back washing operation to remove the accumulated precipitated iron and manganese compounds.

It is an object of the invention to provide an iron and manganese removal material of such character that it can be arranged in liquid permeable beds through which the water may be percolated and coincidentally brought into contact with the material.

Another object of the invention is to provide a material which causes precipitation of the dissolved iron and manganese compounds and coincidentally filters the precipitated compounds from the water.

A further object is to provide an iron and manganese removal material of such density and size that it may be suspended in a stream of water during the washing operation and thus be flushed effectively of the accumulated precipitated iron and manganese compounds.

It is a further object to provide a material which, under normal conditions, is capable of effecting the complete removal of the dissolved iron and manganese compounds without the aid of any other materials or treatments.

It is a further object to provide a material which maintains indefinitely its effectiveness for iron and manganese removal and does not require periodical regeneration or rejuvenation.

A further object is to provide a material for simultaneously softening the water and removing iron and manganese compounds from said water.

The drawing illustrates, somewhat diagrammatically, an apparatus suitable for practicing my improved process.

Briefly, the invention contemplates the provision of a granular material, the granules having a substance exposed upon the surfaces thereof, capable of causing precipitation of the dissolved iron and manganese compounds in the water, said granules being of such size and character as to form a stable water-permeable bed, capable of filtering the flocculent iron and manganese precipitates from the water, and also capable of being suspended in water at ordinary back-wash rates whereby such precipitates may be flushed thoroughly from the bed of material. The granular material also possesses the property of completely removing hydrogen sulphide from water, as will be explained hereinafter.

The granules preferably are composed of a combination of a base material, which is water-resistant but substantially inert as far as the precipitation of iron and manganese compounds is concerned, and an active material. For the base material, porous eruptive rocks are preferred, such as pumice or lava, but other hard, water-resistant materials may be used, such as earthenware, unglazed porcelain, slag, coke, charcoal, etc. Sand and other granular materials having non-porous surfaces may also be used, however. The word "rock" when used without qualification in the specification and claims is intended to include this general class of material.

The active material may be pyrolusite or other manganese dioxide ore. Chemically precipitated manganese dioxide may be used, as well as manganese dioxide produced electro-chemically, for instance, as described and claimed in Oliver W. Storey, United States Patent No. 1,874,827, granted August 30, 1932. Although manganese dioxide is preferred, in combination with a base material, black iron oxide of the type known as mill scale ($Fe_3O_4$) may also be used. Said active material should be finely divided and is united with the base material by means of a water-resistant adhesive or cement. Portland cement may be used, and a hydraulic cement containing relatively large proportions of alumina has been found to be particularly suitable. The proportions of the major ingredients of such high alumina cement are substantially as follows: $Al_2O_3$ 38.0%, $CaO$ 36%, $Fe_2O_3$ 15.0% and $SiO_2$ 6%. Other adhesives which may be used are rubber latex, phenol condensation resins, thermoplastic materials such as pitch and asphalt, etc. The word "cement" as used in the specification and claims is intended to include all of these materials.

The base material may be in the form of sized granules and the active material may be cemented to the surfaces thereof. This is the preferred form, but the base material may also be granular rock material in finely divided or powder form and mixed with the active material in the form of an intimate mixture. In the latter case the base material may be the cement alone which is used to unite the powdered active material. The invention will be described in greater detail in connection with the following specific examples. It is understood, however, that the invention is not limited to these examples.

*Example No. 1*

This example illustrates a preferred material of the invention, comprising sized granules of base material coated with powdered active material, and a method for making the same.

Pumice is crushed, preferably between cooperating rolls to a particle size such that the final coated granules do not exceed a desired maximum size (10 to 60 mesh) as will be explained hereinafter. These sized pumice granules are mixed with the high alumina cement mentioned heretofore in the presence of sufficient water to moisten the mixture but not sufficient to prevent the free running of the granules. The mixing is preferably performed in a rotating drum provided with independently rotating mixing blades. The proportions by weight are about 125 parts of pumice, 60 parts of cement and 35 parts of water. The mixing is continued until the mass is thoroughly mixed and the granules of pumice have a uniform coating of cement upon their surfaces. Then, and while the mixing is being continued, powdered pyrolusite is dusted gradually upon the mass until about 50 parts of pyrolusite has been added. The result is an even coating of pyrolusite upon the granules. The mass is then allowed to stand until the cement has set. This takes five or six hours. Then the mass is flooded with water and allowed to stand in the water for a further period of several hours to complete the hydration of the cement. The water is then drained off and the material which may have caked somewhat, is broken up so that the granules are separated from each other with their jackets of cement and pyrolusite substantially intact. The material is then subjected to a vacuum to draw the air from the pores thereof and reduce its buoyancy, and before the vacuum is released it is again submerged in water. After the vacuum is released the material is subjected to a gentle upward flow of water to float off the unattached pyrolusite powder and the particles of pumice which are smaller than the minimum size it is desired to retain. The material is then drained and dried to the desired moisture content and is ready for use.

In the crushing of the pumice and the washing of the coated granules, the particle size preferably is so chosen that the finished, coated granules form a water-permeable bed which not only acts chemically upon the dissolved iron and manganese compounds but which also is an efficient filter medium for removing from the water the flocculent precipitate formed by said chemical action. Granules of the sizes which pass through a 10 mesh screen and are retained on a 60 mesh screen are satisfactory. The desired sizes of coated granules may be obtained by a screening operation, and this may be carried out with the pumice granules or the final coated granules. The granules described in this example are of suitable density such that they will be raised and maintained in suspension, but will not be washed out of the container, by water flowing upwardly during the flushing operation, which will be described hereinafter. In bulk, the dry granules weigh about 55 to 60 pounds per cubic foot.

*Example No. 2*

In addition to providing a material comprising granules of base substance having coatings of active substance cemented to the surfaces thereof, the invention contemplates the provision of a granular composition comprising an intimate mixture of finely divided base material and active material, as stated heretofore. As an example of the latter type of composition, 125 parts by weight of finely divided pumice, 50 parts of powdered pyrolusite, 60 parts of high alumina cement and 35 parts of water are mixed together thoroughly and the mixture poured into a large number of small, shallow wooden or metal molds which can be made by providing shallow trays with egg crate type separators. After the cement has set, the small blocks of the composition are removed and crushed in a suitable crusher and are screened and the particles between 10 mesh and 60 mesh are retained for use. The product comprises porous granules with particles of pyrolusite exposed upon the surfaces and in the pores.

*Example No. 3*

In a further modification of the invention 100 parts by weight of powdered pyrolusite are mixed with 25 parts of high alumina cement and 14 parts of water. After thorough mixing, the composition is cast, crushed, and separated in the same manner as described in connection with the preceding example. Because of the increased density of this material, the granule size is maintained between approximately 28 and 60 mesh.

*Example No. 4*

It is also possible to make a material adapted for simultaneously removing dissolved iron and manganese compounds and softening the water. For this purpose the granular base materials may be any one of the granular zeolite compounds commonly used for water softening purposes, one example of which is described and claimed in Schorger United States Patent No. 1,949,360, granted February 27, 1934. Such zeolite in finely divided form, and powdered pyrolusite, may be cemented together with a rubber latex or phenol condensation resin adhesive, and the cemented mixture reduced to the desired particle size in a process similar to that described in connection with Example 2. The product is capable of performing the double function of softening and removing the dissolved iron and manganese compounds from water.

In addition to the examples given above, various combinations of the different base materials, cements and adhesives, and active materials mentioned heretofore may be used. The proportions of the ingredients may also be varied within limits, that is, it is not advisable to use such a small proportion of cement as to weaken the granules, nor such a small proportion of active material as to reduce the effectiveness below the standards of good operation. Sufficient cement should not be used to cause the material to cake together into a solid mass which cannot again be broken up into discrete particles.

In carrying out the process of the invention, any suitable container 10 may be used, having connections 11 and 12 for causing the flow of water downwardly and also upwardly therethrough. A layer of gravel 13 may be provided, above which is located a bed of granules 14 such as illustrated by the foregoing examples, and a "freeboard" space 15 may be provided above the granule bed.

The process of treatment is very simple. The water which is to be treated is caused to flow downwardly through the bed. The dissolved iron and manganese compounds of the water are converted into a flocculent precipitate which is filtered from the water by the bed. After the precipitate has accumulated to the point where an objectionable resistance to water flow arises, the bed may be flushed or back washed by running water through it in an upward direction at such a rate as to raise and suspend the granules and wash out the accumulated iron and manganese compounds. The granules should not be washed out of the container, however. The usual practice is to flush at a rate of from 8 to 20 gallons of water per minute per square foot of bed area. In this way complete removal of the iron and manganese compounds is obtained, and after the flushing is stopped, the granules settle back freely again to form a loose, readily permeable bed. Also in this way any tendency is counteracted for the bed to become caked or solidified with a few permanent channels therein. When making the iron and manganese removal material of this invention the particle size and density should be regulated so that the described suspension of said particles is obtained during flushing. Thorough flushing and satisfactory operation cannot be obtained without such suspension. Large granules are more difficult to suspend than small ones. It has been found to be impossible to suspend, at ordinary back wash rates, particles of pyrolusite (a relatively dense material), which particles are large enough to be retained on a 28 mesh screen. The same has been found to be true of the somewhat less dense composite particles of Examples 1 and 2 which are large enough to be retained on a 10 mesh screen. Granules smaller than the above sizes may be suspended in satisfactory manner but those which are small enough to pass through a 60 mesh screen make too compact a bed for the easy downward percolation of the water, and in addition are too easily carried out of the container during back-wash.

Although it is preferred to have the iron and manganese precipitating material act also as the filter, a separate filter of sand or other suitable material may be provided for filtering the water which passes through the bed of granules. If such a filter is used, the granules may be larger so that at least a part of the flocculent iron and manganese precipitate formed passes through the treating bed and is retained subsequently by the separate filter. In such a system the finely divided active material may be cemented to larger surfaces, such as coarse rock, large flat surfaces, such as sheets, boards, etc., and these surfaces may be arranged in the path of the water in such manner that all of the water comes in contact with them to precipitate the iron and manganese compounds.

As mentioned heretofore, in addition to its iron and manganese removing properties, the material possesses the property of completely removing hydrogen sulphide from water, which is an important advantage where waters are encountered which contain this substance. It is oxidized by the manganese dioxide to sulphuric acid. The manganese dioxide is reduced a corresponding amount but may be restored to its higher oxygen content and its full effectiveness by periodic or continuous treatment with potassium or sodium permanganate. The material may also be restored by aeration, preferably by aerating the water substantially simultaneously with its passage through the material.

The chemical or physico-chemical action upon the dissolved iron and manganese salts is not thoroughly understood. It may be that the manganese dioxide releases oxygen to oxidize the salts to insoluble hydrates and/or oxides and then recovers dissolved oxygen from the water to regain its former character. The manganese dioxide may act as a catalyst and make available the oxygen of the water for the oxidation of the compounds. In any event, flocculent iron and manganese hydrates and/or oxides are precipitated. The high alumina cement mentioned heretofore, and Portland cement, when used in the granules, provides an alkaline reaction and raises the pH value of the water, which aids and promotes the iron and manganese precipitation, particularly in waters which have a low pH value. The effectiveness of the material continues to be unimpaired for indefinite periods under normal conditions, and regeneration or conditioning thereof or any supplemental treatment of the water does not become necessary with use. Under normal conditions the water contains sufficient available oxygen for the oxidation of the iron and manganese compounds. However, if the water is deficient in this respect, I have found that the deficiency may be supplied by aeration of the water or other known methods for introducing oxygen or ozone into water, prior to its passage through the bed of material. The available oxygen should be equal to about 15% of the combined weight of the ferrous iron and the manganous manganese present in the water. It is not advisable to introduce an excess of oxygen beyond that required because of the corrosive effects thereof upon piping, etc., and also the resulting re-acquisition of iron by the water.

Conditions are not considered normal if the water contains dissolved hydrogen sulphide, or more than 100 parts per million of dissolved carbon dioxide or if the pH value is under 6. The carbon dioxide excess may be corrected by preliminary aeration and the same treatment also corrects for the presence of hydrogen sulphide, since aeration removes this substance directly and also compensates for any reducing action upon the bed of material, as explained heretofore. Excess acidity may be corrected by the addition of small quantities of lime or soda ash. When the mentioned conditions are corrected, the dissolved iron and manganese compounds are readily removed by passing the water through the bed of granules.

I claim:

1. As an agent for the removal of iron, manganese or hydrogen sulfide from water, a granule comprising a mixture of rock, cement, and a finely divided oxide from the group consisting of manganese dioxide and the black oxide of iron ($Fe_3O_4$) known as mill scale, said granule being of a size to pass through a 10 mesh screen and be retained on a 60 mesh screen.

2. As an agent for the removal of iron, manganese or hydrogen sulfide from water, a granule comprising a mixture of pumice, cement and powdered pyrolusite, and being of a size to pass through a 10 mesh screen and be retained on a 60 mesh screen.

3. As an agent for the removal of iron, manganese or hydrogen sulfide from water, a granule of porous rock, a coating of high alumina cement upon said granule, powdered manganese dioxide ore fixed in said cement and attached thereby to the surfaces of said granule, said granule being of a size to pass through a 10 mesh screen and be retained on a 60 mesh screen.

4. As an agent for the removal of iron, manganese or hydrogen sulfide from water, a particle of pumice, said particle having powdered pyrolusite cemented to the surfaces thereof and being of a size to pass through a 10 mesh screen and be retained on a 60 mesh screen.

5. Material for the removal of dissolved iron and manganese compounds from water comprising granules of hard, water-resistant substances having powdered manganese dioxide attached to the surfaces thereof by means of cement, said granules comprising sizes which pass through a 10 mesh screen and are retained on a 60 mesh screen.

6. Material for the removal of dissolved iron and manganese compounds from water comprising a bed of granules of hard, water-resistant substance having pyrolusite attached to the surfaces thereof by means of cement, said granules being of such size and density that they sink in quiescent water but are suspended by a stream of water flowing upwardly at a rate between 8 and 20 gallons per minute per square foot of bed area.

7. A filter bed comprising a mass of fine granules of such size and density that the granules sink in quiescent water but are suspended by a stream of water flowing upwardly at a rate between 8 and 20 gallons per minute per square foot of bed area, said granules comprising a mixture of hard, water-resistant substance, cement and a finely divided oxide from the group consisting of manganese dioxide and the black oxide of iron ($Fe_3O_4$) known as mill scale.

8. Material for the simultaneous softening and removal of dissolved iron and manganese compounds from water comprising granules of base exchange zeolite having powdered manganese dioxide attached to the surfaces thereof by means of cement, said granules being of a size to pass through a 10 mesh screen and be retained on a 60 mesh screen.

MILTON J. SHOEMAKER.